(12) United States Patent
Myers et al.

(10) Patent No.: US 11,886,236 B2
(45) Date of Patent: Jan. 30, 2024

(54) DESKTOP PLATFORM

(71) Applicant: Roto VR Limited, Stanmore Middlesex (GB)

(72) Inventors: Elliott Myers, Stanmore Middlesex (GB); Gavin Waxkirsh, Stanmore Middlesex (GB)

(73) Assignee: ROTO VR LIMITED, Stanmore (GB)

(*) Notice: Subject to any disclaimer, the term of this patent is extended or adjusted under 35 U.S.C. 154(b) by 607 days.

(21) Appl. No.: 17/255,836

(22) PCT Filed: Jun. 27, 2019

(86) PCT No.: PCT/GB2019/051815
§ 371 (c)(1),
(2) Date: Dec. 23, 2020

(87) PCT Pub. No.: WO2020/002919
PCT Pub. Date: Jan. 2, 2020

(65) Prior Publication Data
US 2021/0274931 A1 Sep. 9, 2021

(30) Foreign Application Priority Data
Jun. 28, 2018 (GB) .................................. 1810599

(51) Int. Cl.
G06F 1/16 (2006.01)
H04N 23/56 (2023.01)
H04N 23/90 (2023.01)
G09F 9/30 (2006.01)
H04N 13/246 (2018.01)
A47B 21/00 (2006.01)
A47C 7/72 (2006.01)
G06F 3/01 (2006.01)
(Continued)

(52) U.S. Cl.
CPC ............ *G06F 1/1605* (2013.01); *A47B 21/00* (2013.01); *A47C 7/723* (2018.08); *G06F 3/011* (2013.01); *G09F 9/301* (2013.01); *H04N 13/246* (2018.05); *H04N 23/56* (2023.01); *H04N 23/90* (2023.01); *A47B 21/04* (2013.01); *A47B 2083/025* (2013.01); *A47B 2200/0072* (2013.01); *A47B 2200/0073* (2013.01); *A47B 2200/0078* (2013.01); *A47B 2220/0077* (2013.01)

(58) Field of Classification Search
CPC .............................. G06F 1/1605; G09F 9/301
See application file for complete search history.

(56) References Cited

U.S. PATENT DOCUMENTS 7,034,902 B2 * 4/2006 Tajima .................... H04N 5/64
248/221.11
7,679,639 B2 * 3/2010 Harrell .................... H04N 7/15
348/14.08
(Continued)

OTHER PUBLICATIONS

Joris, Pierre; International Search Report; dated Oct. 2, 2019; 5 pages, HV Rijswijk.

*Primary Examiner* — Lisa Lea-Edmonds
(74) *Attorney, Agent, or Firm* — STETINA BRUNDA GARRED & BRUCKER

(57) ABSTRACT

A desktop platform for use with virtual, augmented or mixed reality technology is provided. The platform includes a plurality of camera sections, a keyboard section, a trackpad section, a screen section, and means for supporting a user input device.

16 Claims, 8 Drawing Sheets

(51) Int. Cl.
*A47B 21/04* (2006.01)
*A47B 83/02* (2006.01)

(56) References Cited

U.S. PATENT DOCUMENTS

| | | | | |
|---|---|---|---|---|
| 8,427,523 | B2* | 4/2013 | Harrell | H04N 7/15 |
| | | | | 709/204 |
| 8,749,959 | B2* | 6/2014 | Riley | A47B 83/02 |
| | | | | 446/482 |
| 8,953,308 | B2* | 2/2015 | Riley | A47B 21/04 |
| | | | | 446/482 |
| 9,282,814 | B2* | 3/2016 | Riley | A47C 7/723 |
| 9,389,643 | B1* | 7/2016 | Clark | G06F 1/1637 |
| 9,693,015 | B2* | 6/2017 | McArdell | A47B 21/00 |
| 9,720,444 | B2* | 8/2017 | Holden | A47B 13/081 |
| 9,750,341 | B2* | 9/2017 | Riley | A47B 83/02 |
| 10,314,391 | B2* | 6/2019 | DesRoches | A47B 11/00 |
| 10,376,044 | B2* | 8/2019 | Shen | G06F 1/162 |
| 10,413,777 | B2* | 9/2019 | Hsieh | A47B 83/02 |
| 10,548,395 | B2* | 2/2020 | DesRoches | A47B 21/02 |
| 10,617,299 | B2* | 4/2020 | Sanchez | A61B 5/0022 |
| 11,185,158 | B1* | 11/2021 | Kincaid | F16M 13/02 |
| 2003/0112591 | A1* | 6/2003 | Zodnik | G06F 1/16 |
| | | | | 361/679.02 |
| 2009/0325686 | A1* | 12/2009 | Davis | G07F 17/3239 |
| | | | | 463/25 |
| 2010/0001563 | A1* | 1/2010 | Baru | F16M 11/18 |
| | | | | 248/122.1 |
| 2011/0075337 | A1* | 3/2011 | Riley | A47C 7/727 |
| | | | | 361/679.21 |
| 2011/0115262 | A1 | 5/2011 | Hill | |
| 2012/0026663 | A1* | 2/2012 | Costamagna | A47B 21/00 |
| | | | | 108/3 |
| 2013/0314852 | A1* | 11/2013 | Kincaid | F16M 11/04 |
| | | | | 361/679.01 |
| 2014/0285959 | A1* | 9/2014 | Riley | A47B 21/00 |
| | | | | 108/50.01 |
| 2015/0351529 | A1* | 12/2015 | Riley | A47C 7/723 |
| | | | | 297/217.3 |
| 2017/0259111 | A1 | 9/2017 | Hsieh | |

* cited by examiner

DESKTOP PLATFORM

CROSS-REFERENCE TO RELATED APPLICATIONS

The present application claims priority to PCT International Patent Application No. PCT/GB2019/051815, filed Jun. 27, 2019, and European Patent Application No. 1810599.9 filed on Jun. 28, 2018, the disclosures of which are incorporated herein by reference.

STATEMENT RE: FEDERALLY SPONSORED RESEARCH/DEVELOPMENT

Not Applicable

BACKGROUND

The invention relates to a desktop platform. In particular, the invention relates to a desktop. The invention relates to a desktop platform. In particular, the invention relates to a desktop platform for mounting on a chair, a table or another object, the desktop platform being arranged to support one or more user input devices for a virtual reality, mixed reality or augmented reality system.

BACKGROUND OF THE INVENTION

Virtual, augmented and mixed reality technologies involve a user being shown a virtual object. The virtual object may be part of a completely virtual environment which the user sees by, for example, wearing a headset that occludes the real world from the user's view. Alternatively, the virtual object may be superimposed on the real world. For instance, the virtual object may be a hologram or other projection, or may be a foreground image superimposed onto a background image corresponding to the real world, the foreground image and the background image being shown to the user on a screen such as a mobile phone screen.

The user may interact with the virtual object by providing inputs to a system (such as a personal computer, a mobile phone or a games console) which controls the screen or projector that is displaying the virtual object to the user. The user may for example provide inputs to the system via one or more user input devices such as a controller, a mouse, a keyboard, or another input means.

The invention aims to provide improvements for users interacting with virtual, augmented and mixed reality technologies.

BRIEF SUMMARY

Summary of the Invention

According to a first embodiment of the invention, there is provided a desktop platform as claimed in claim 1.

According to a further embodiment of the invention, there is provided a system as claimed in claim 14.

Optional features are set out in the dependent claims.

BRIEF DESCRIPTION OF THE DRAWINGS

Specific embodiments of the invention will now be described by way of non-limiting examples, in which.

DETAILED DESCRIPTION

The present embodiments represent the best ways currently known to the applicant of putting the invention into practice, but they are not the only ways in which this can be achieved. They are illustrated, and they will now be described, by way of example only.

Figure 1:
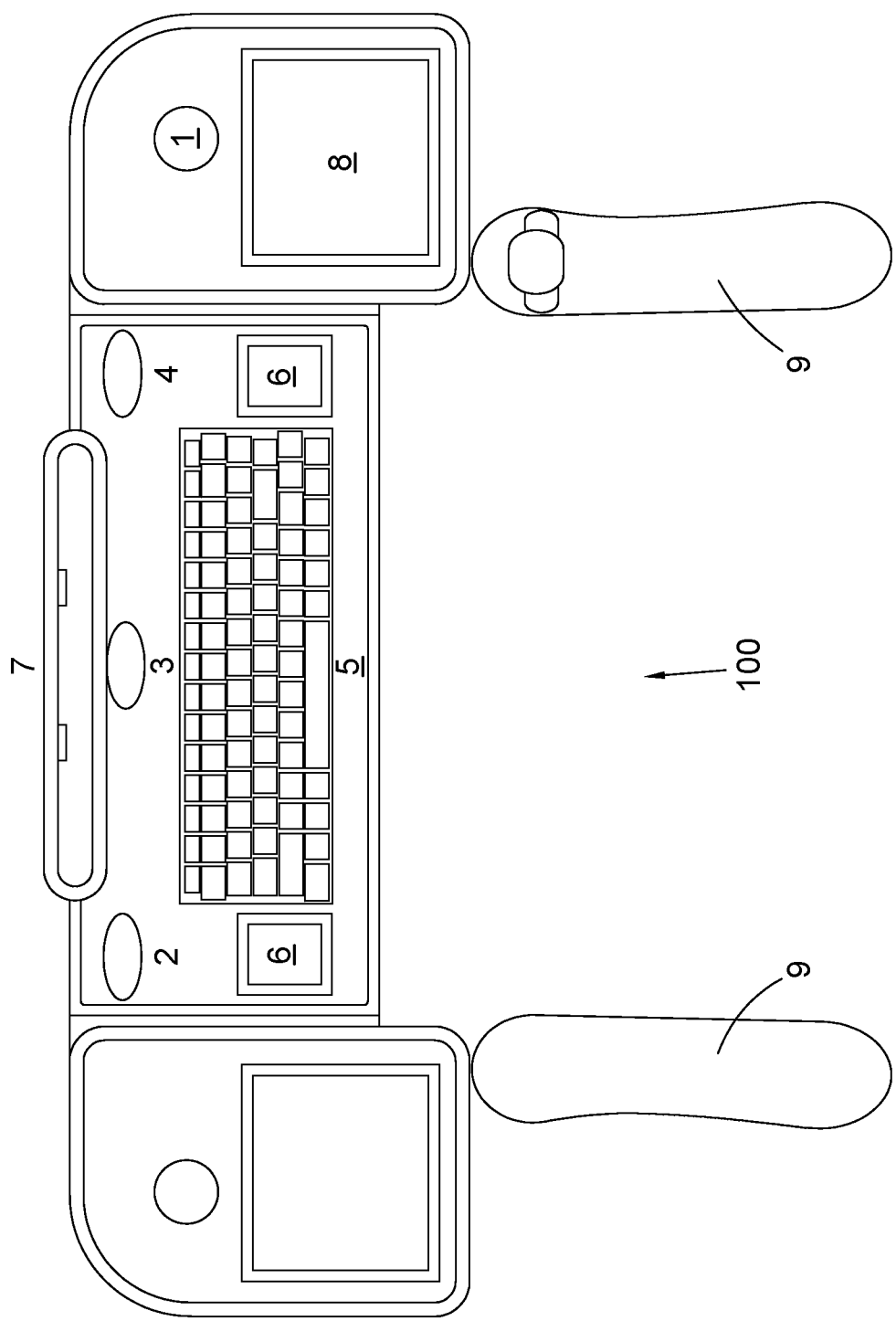
FIG. 1 schematically illustrates in plan view a desktop platform in accordance with embodiments of the invention.

FIG. 1 illustrates an example desktop platform 100 including a plurality of camera sections 2, 3, 4 at which can be mounted corresponding cameras. In the embodiment illustrated in FIG. 1, the camera sections 2, 3, 4 comprise apertures/recesses in the upper surface of the desktop platform 100 which are sized and shaped to receive camera supports on which the cameras can be mounted. The cameras, once mounted on the camera supports, may be arranged to point towards a user of the desktop platform (user's arms 9 illustrated in FIG. 1).

In the illustrated example, the camera sections 2, 3, 4 are arranged along a longitudinal line through the desktop platform 100. In other embodiments, the camera sections 2, 3, 4 may be at different positions. For example, it may be advantageous in some embodiments for the camera sections to be located on a curve such that the distance of each corresponding camera from the user's face is approximately the same. In other embodiments, it may be desirable for the camera sections to be staggered in the depth of the desktop platform 100 such that each corresponding camera is at a different distance from the user (i.e. different depth into the desktop platform 100 relative to the user). For instance, in one embodiment, the left camera section 2 may be farthest from the user, the right camera section 4 may be closest to the user, and the middle camera section 3 may be between the left and right camera sections in terms of distance from the user. Other variations are also possible. A staggered arrangement may enable the cameras to better capture 3D information, e.g. about the shape and contours of the user's face. This may be particularly advantageous where the cameras are intended to be used to generate image data about the user's face which is to be converted into a hologram for display at another location.

Figure 5:
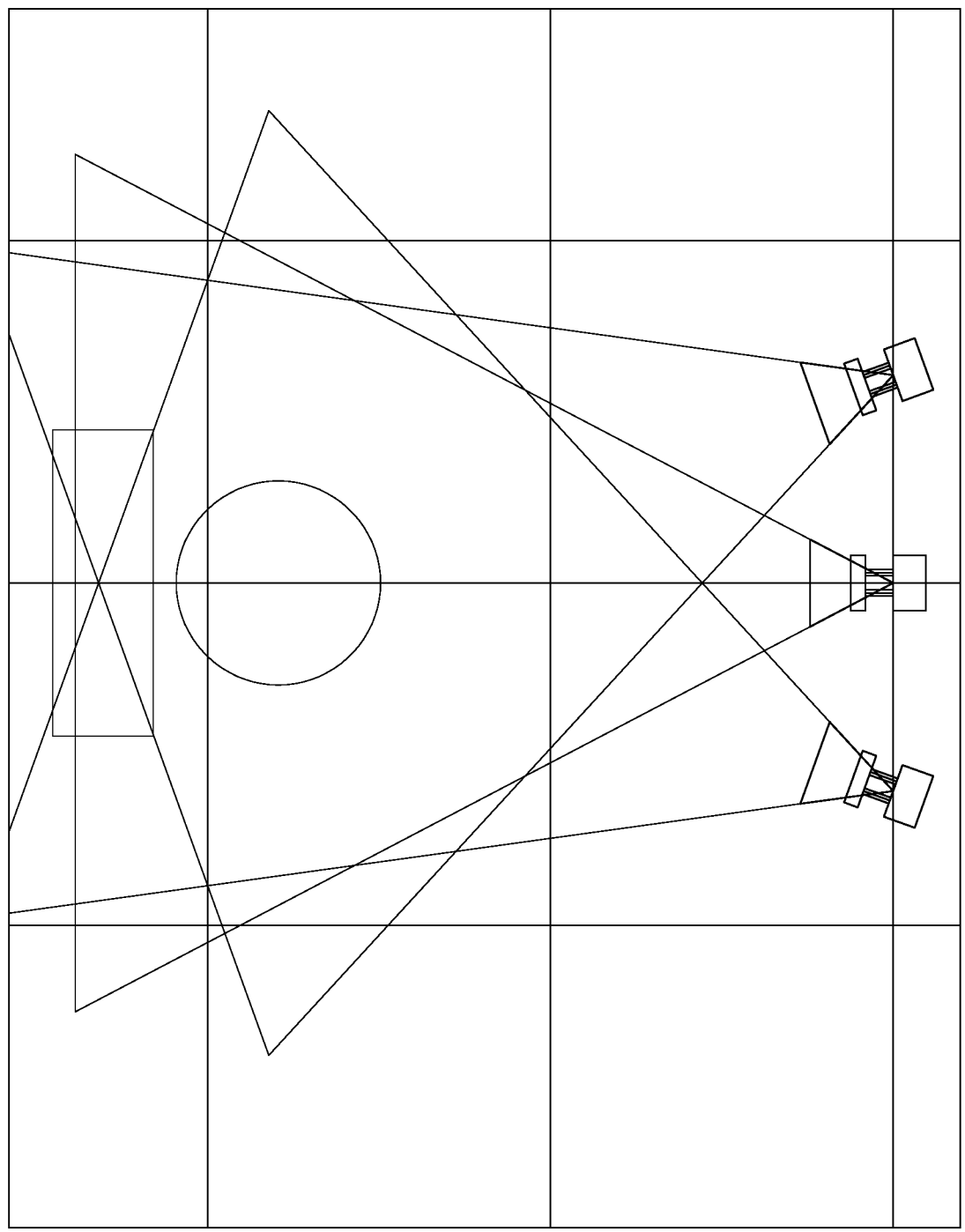
FIG. 5 schematically illustrates in plan view fields of view of three cameras.
Figure 7:
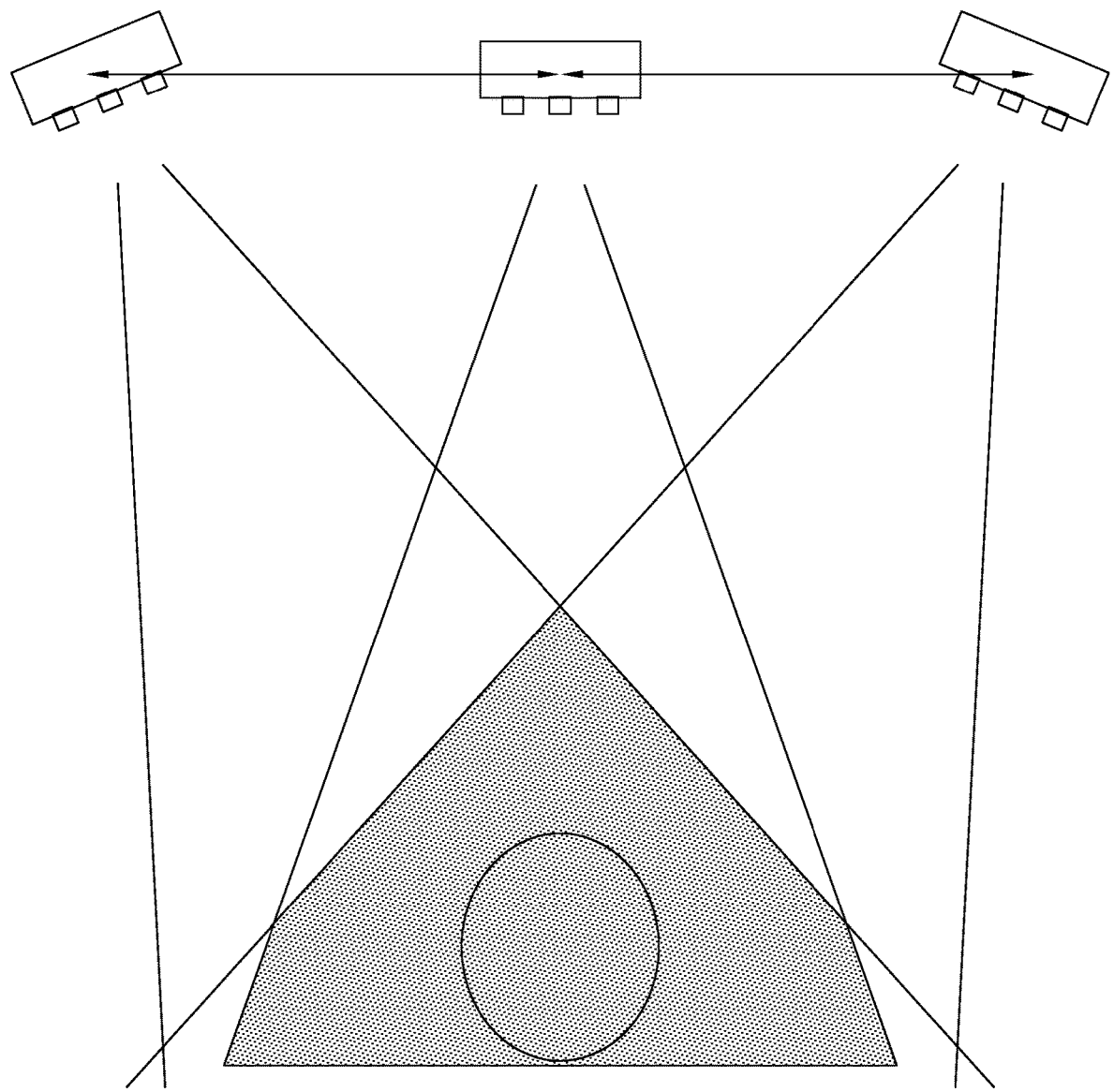
FIG. 7 schematically illustrates in plan view fields of view of three cameras.

The camera sections 2, 3, 4 may be positioned to optimise an extent or location of overlap between the fields of view of cameras mounted on the camera sections 2, 3, 4. For example, the camera sections 2, 3, 4 may be positioned such that, when cameras are mounted at the camera sections 2, 3, 4, the user's head is at approximately the centre of the overlap of the cameras' fields of view. This overlapping may allow the cameras to obtain image data which enables the user's head and face to be imaged in three dimensions. FIGS. 5 and 7 illustrate examples of how the cameras' fields of view may overlap, with the user's head being represented by the circle on the left-hand side of FIG. 5, the three cameras being illustrated on the right-hand side of FIG. 5, and the fields of view being illustrated by the approximately triangular sections extending from the cameras towards the user.

In some embodiments, the camera sections 2, 3, 4 may have cameras or camera supports (e.g. foldable or telescoping camera supports) permanently or semi-permanently affixed to them. This may advantageously minimise the user input that is required to ready the desktop platform 100 for use with cameras—the user may simply leave the cameras/supports as they are, or rotate the cameras to ensure they are pointing in the correct directions, and/or unfold or extend the camera supports.

In other embodiments, the camera sections 2, 3, 4 may be arranged and intended for the cameras or camera supports to be temporarily inserted by a user for use and removed afterwards. This may make the desktop platform 100 easier to package and transport. In some embodiments, fixing means (such as screws, nuts and bolts, or clasps) may be provided to help ensure that the cameras or camera supports are retained in the camera sections 2, 3 4. In other embodiments, an interference fit may be relied upon to keep the cameras or their supports in place in the camera sections 2, 3, 4 during use.

In some embodiments, the camera sections 2, 3, 4 may be areas of the upper surface of the desktop platform 100 which are marked (e.g. coloured or outlined) to indicate where a camera should be positioned. This marking may indicate a location and/or an orientation of the camera.

In some embodiments, the camera sections 2, 3, 4 include holes and/or guides through which cables for connecting the cameras to an external device such as a computer, a mobile phone or a games console can pass while the cameras are in use. In other embodiments, such cables may pass along the surface of the desktop platform 100 and off the front, the back and/or the sides of the desktop platform 100.

In some embodiments, the camera sections 2, 3, 4 may be part of a screen section 7, as will be discussed in more detail below.

Although in the embodiment illustrated in FIG. 1 the camera sections 2, 3, 4 are positioned in front of screen section 7 (i.e. closer to the user, when the desktop platform 100 is in use, than the screen section 7 is), in other embodiments, the camera sections may be positioned behind the screen section 7 (i.e. further away from the user, when the desktop platform 100 is in use, than the screen section 7 is), or to the sides of the screen section 7.

The illustrated desktop platform 100 also includes a keyboard section 5. The keyboard section 5 accommodates a keyboard which can be used to provide inputs to the external device. In some embodiments, a keyboard may be permanently or semi-permanently embedded in the keyboard section 5. In such embodiments, the desktop platform 100 may be supplied with the keyboard, either in situ or ready for semi-permanent installation in the keyboard section 5. In other embodiments, the keyboard section 5 may be a recessed area of the desktop platform 100 which is sized and shaped such that a computer keyboard fits in the area. In some embodiments, the keyboard section 5 may be an area of the upper surface of the desktop platform 100 which is marked (e.g. coloured or outlined) to indicate where a keyboard should be positioned. This marking may indicate a position and/or an orientation of the keyboard.

In some embodiments, the keyboard section 5 includes a hole and/or a guide through which a cable for connecting the keyboard to the external device can pass while the keyboard is in use. In other embodiments, such a cable may pass along the surface of the desktop platform 100 and off the front, the back or the side of the desktop platform 100.

The illustrated desktop platform 100 also includes two trackpad sections 6. Other embodiments may include only a single trackpad section 6, or may include more than two trackpad sections 6. Each trackpad section accommodates a trackpad which can be used to provide inputs to the external device. Having trackpad sections 6 for at least two trackpads may enable a user to interact with virtual objects or environments in an efficient and/or intuitive way, e.g. by being able to change two different variables at the same time using the two different trackpads. For instance, in some virtual environments, it may be desirable to control a level of visual zoom with one trackpad and a further parameter (such as an acceleration of a vehicle or a level of force to be applied to an object) with the other trackpad. Having two trackpad sections 6 also enables left- and right-handed users to use the desktop platform 100.

In some embodiments, a trackpad may be permanently or semi-permanently embedded in one or more of the trackpad sections 6. In such embodiments, the desktop platform 100 may be supplied with the trackpad(s), either in situ or ready for semi-permanent installation in the trackpad sections 6. In other embodiments, the trackpad sections 6 may be recessed areas of the desktop platform 100 which are sized and shaped such that a trackpad fits in the areas. In some embodiments, the trackpad sections 6 may be areas of the upper surface of the desktop platform 100 which are marked (e.g. coloured or outlined) to indicate where a trackpad should be positioned. These markings may indicate positions and/or orientations of the trackpads.

In some embodiments, each trackpad section 6 includes a hole and/or a guide through which a cable for connecting the trackpad to the external device can pass while the trackpad is in use. In other embodiments, such a cable may pass along the surface of the desktop platform 100 and off the front, the back, or the side of the desktop platform 100.

The illustrated desktop platform 100 also includes a screen section 7. The screen section 7 accommodates and/or supports a screen which can be used to provide outputs from the external device. In some embodiments, a screen may be permanently or semi-permanently embedded in or affixed to the screen section 7. In such embodiments, the desktop platform 100 may be supplied with the screen, either in situ or ready for semi-permanent installation in the screen section 7. Alternatively, a screen may be supplied separately and be installable in the screen section 7, e.g. by a user of the desktop platform 100. In other embodiments, the screen section 7 may be a recessed area of the desktop platform 100 which is sized and shaped such that at least part of a screen fits in the area. The screen section 7 may for instance be a slot into which a lower portion of a screen (e.g. a tablet-like screen device) can be slotted and which holds such a screen at an angle suitable for viewing by the user of the desktop platform 100. In some embodiments, the screen section 7 may be an area of the upper surface of the desktop platform 100 which is marked (e.g. coloured or outlined) to indicate where a screen should be positioned. This marking may indicate a position and/or an orientation of the screen.

In some embodiments, the screen section 7 includes a hole and/or a guide through which a cable for connecting the screen to the external device can pass while the screen is in use. In other embodiments, such a cable may pass along the surface of the desktop platform 100 and off the front, the back or the side of the desktop platform 100.

The screen may in some embodiments be a rigid screen. In some examples, it may be a powered screen, such as a liquid crystal display (LCD), a light-emitting diode (LED) display or a thin-film transistor (TFT) display. In other examples, it may be an unpowered screen which acts as a blank surface onto which content can be projected. The opacity of the screen may be selected to achieve a particular outcome. For example, it may be desirable for the screen to be at least partially transparent, so that the user can see through it when there is nothing being displayed on the screen. In other cases, it may be preferable for the screen to be opaque, so that the real world behind the screen (relative to the user) does not interfere with the image displayed on the screen.

Where the screen is a rigid screen, the screen may rest on or in the desktop platform 100 in the screen section 7 directly or be supported by a hinge, bracket, platform and/or other support means. In some embodiments —such as the embodiments illustrated in FIGS. 3 and 4—the screen may be hinged (e.g. where the screen meets the surface of the desktop platform 100) such that the screen can fold down (e.g. against the keyboard section 5 in the illustrated embodiment). Thus the desktop platform 100 may have a "closed" configuration in which the screen is folded down against the keyboard section 5, in some embodiments masking the keyboard section 5 completely. This closed configuration may be advantageous for storage and transport of the desktop platform 100. From the closed configuration, the desktop platform 100 can be opened into an open configuration in which the keyboard section 5 and other sections of the desktop platform 100 are visible.

In other embodiments, the screen may be a soft screen, such as a rollable projector screen, and may be mounted on a rolling mechanism such that the screen can be unwound from and retracted into the rolling mechanism. The screen may be supportable in its unwound form by one or more rods, frames and/or clips which hold the screen at a suitable angle for viewing by a user of the desktop platform 100 and prevent the screen from retracting into the rolling mechanism. Like embodiments with a hard screen, embodiments with a soft screen may be considered to have an "open" configuration in which the screen is in its unwound and upright form, and a "closed" configuration in which the screen is retracted. In some embodiments, a soft screen may be provided which does not retract into a rolling mechanism. Such a soft screen may instead be clippable or otherwise fixable to the desktop platform 100 when not in use such that the screen obscures the keyboard section 5 (and possibly other sections of the desktop platform 100) to protect the keyboard section 5 and give the impression that the desktop platform 100 is "closed".

Figure 2:
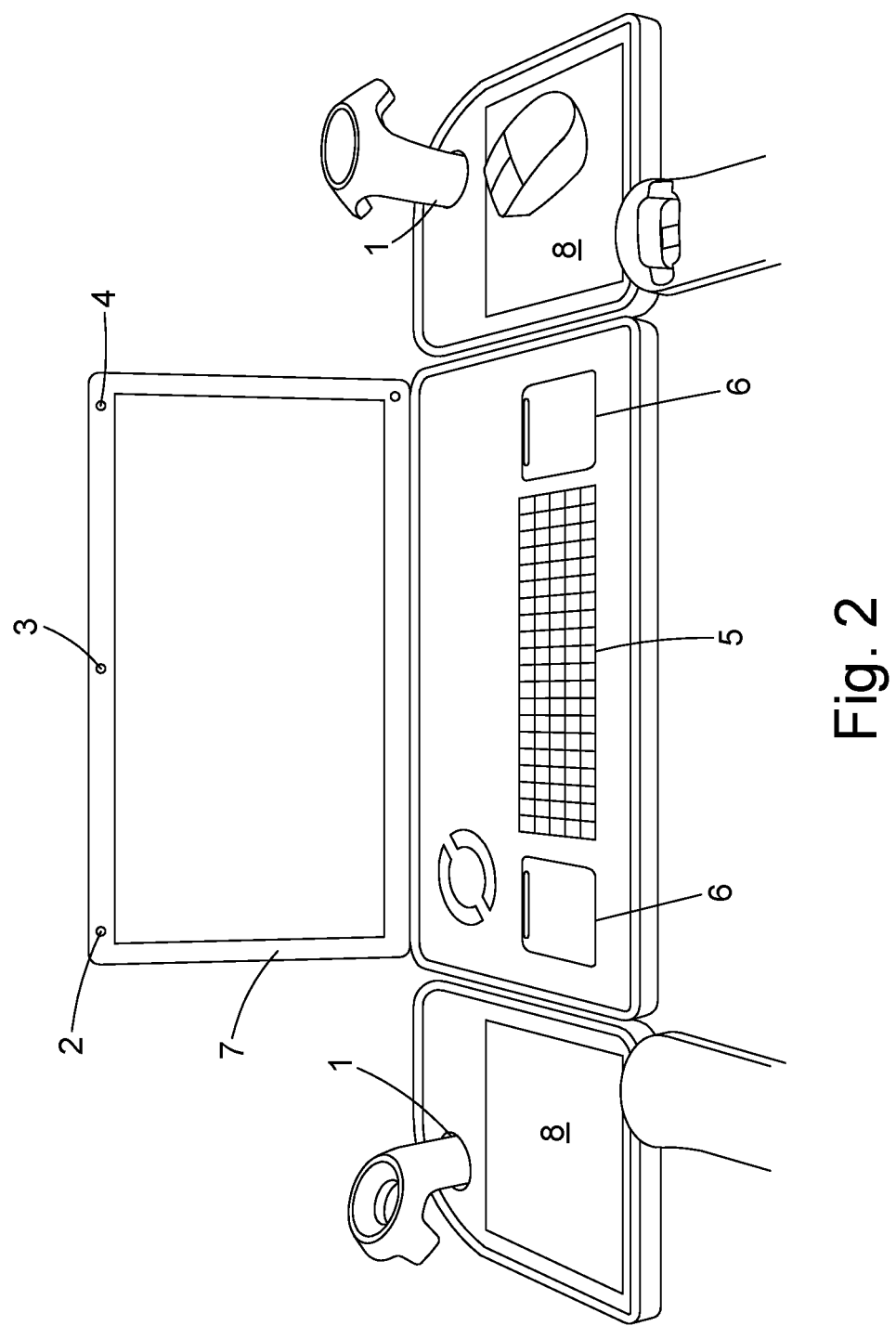
FIG. 2 schematically illustrates in perspective front view a desktop platform in accordance with embodiments of the invention.

In the illustrated embodiments, holes 1 provide means for supporting handheld user input devices. FIG. 2 illustrates an embodiment of the desktop platform 100 with example handheld user input devices resting in the holes 1. In particular, part of each handheld user input device protrudes through the hole to the underside of the desktop platform 100, part of each handheld user input device is located in the hole itself, and part of each handheld user input device is above the upper surface of the desktop platform 100.

Advantageously, this may enable a user who is currently immersed in a virtual or augmented reality to put the handheld user input devices down with minimal interruption to the immersive experience, since the user will be able to feel and/or see (depending on how the user is experiencing the virtual/augmented reality) the holes 1 and insert the handheld user input devices into the holes 1 so that the devices are stowed for future use. This may be particularly useful in augmented reality environments, since the user may be able to see the holes 1 while in the augmented reality environment and align the user input devices accordingly. Furthermore, the holes 1, the handheld user input devices and/or the user's hands may be simulated in virtual reality environments, enabling the user to see where to put the input devices down while in a virtual reality environment. Holes advantageously minimise the risk of the handheld user input devices rolling off the desktop platform 100 and being damaged or damaging something else when the user input devices hit the floor.

Figure 3:
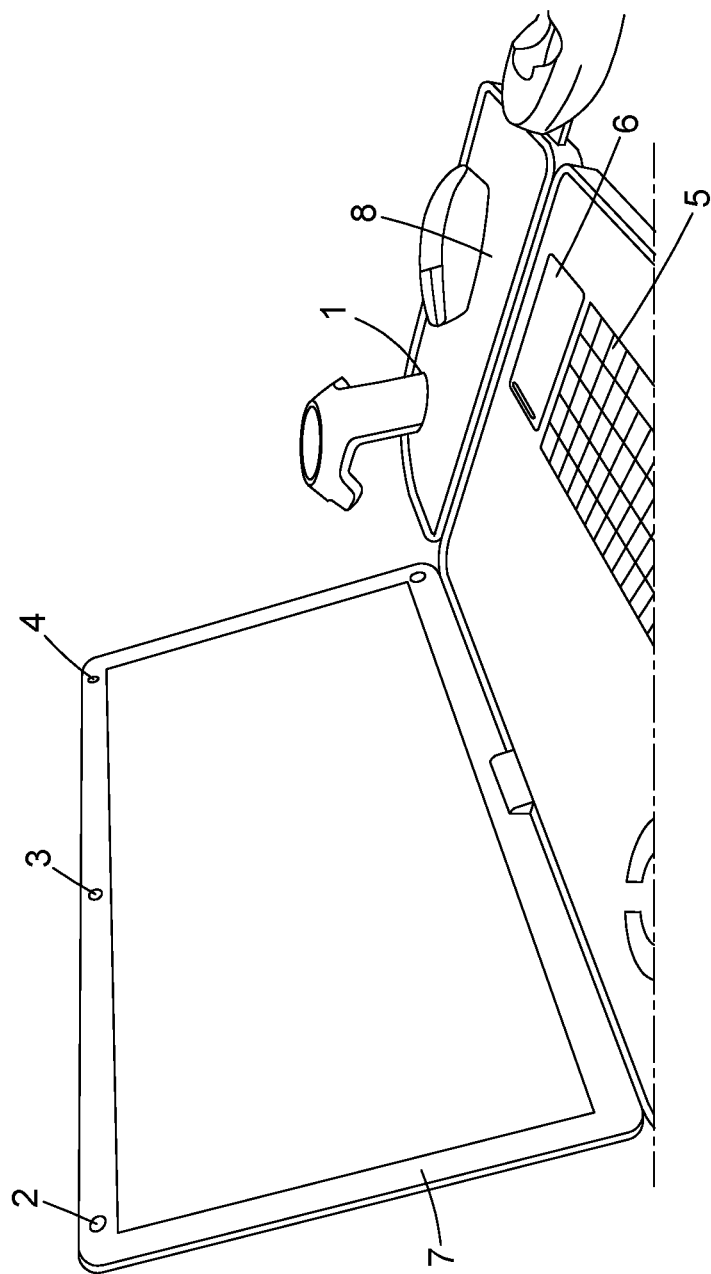
FIG. 3 schematically illustrates in perspective side view a desktop platform in accordance with embodiments of the invention.

In the illustrated embodiments, mousemat areas 8 also provide means for supporting user input devices. As illustrated in FIGS. 2 and 3, a user may place and use a mouse on either of the mousemat areas 8. The mousemat areas 8 may accordingly be provided with a suitable surface to enable an optical mouse and/or a ball mouse to work effectively. Other types of input device, such as trackballs or joysticks, may also be placed and used in the mousemat areas 8, according to user preference and requirements. The presence of two mousemat areas 8 advantageously allows a user to use two such input devices simultaneously, and for left- and right-handed users to use the desktop platform 100.

Figure 4:
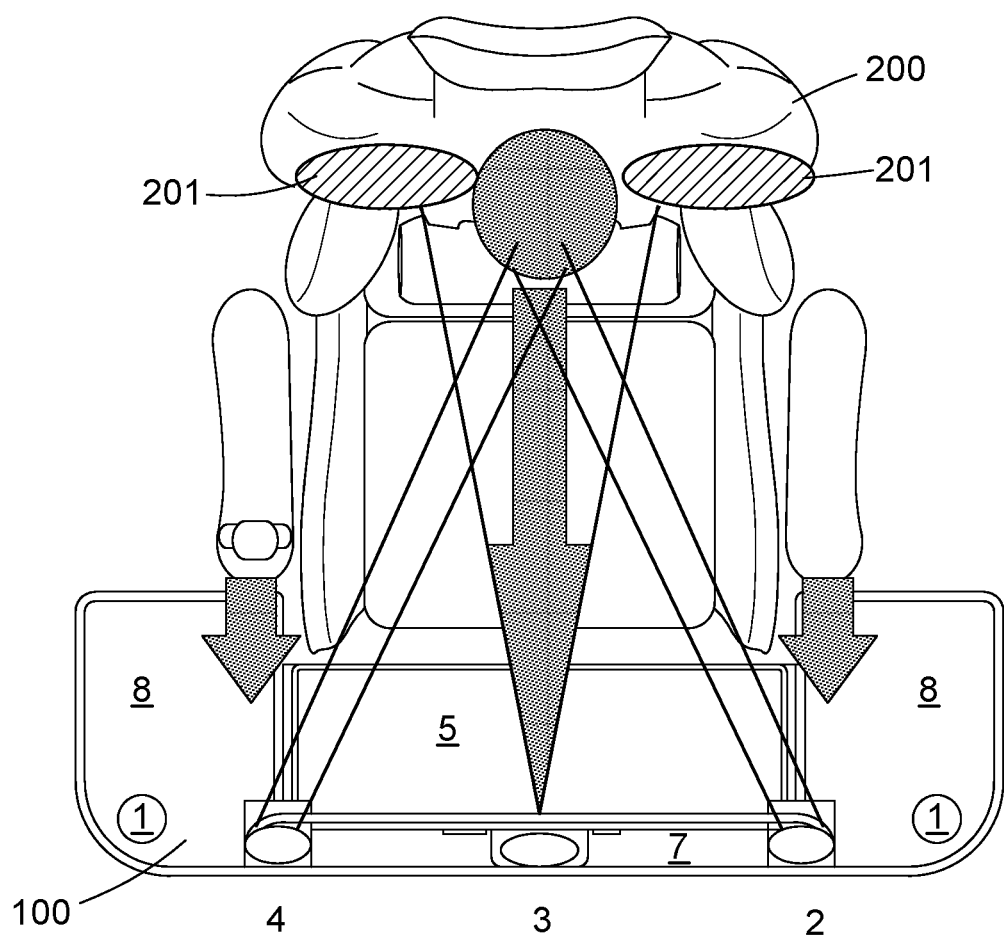
FIG. 4 schematically illustrates in plan view a desktop platform in accordance with embodiments of the invention, mounted on a chair.
Figure 6:
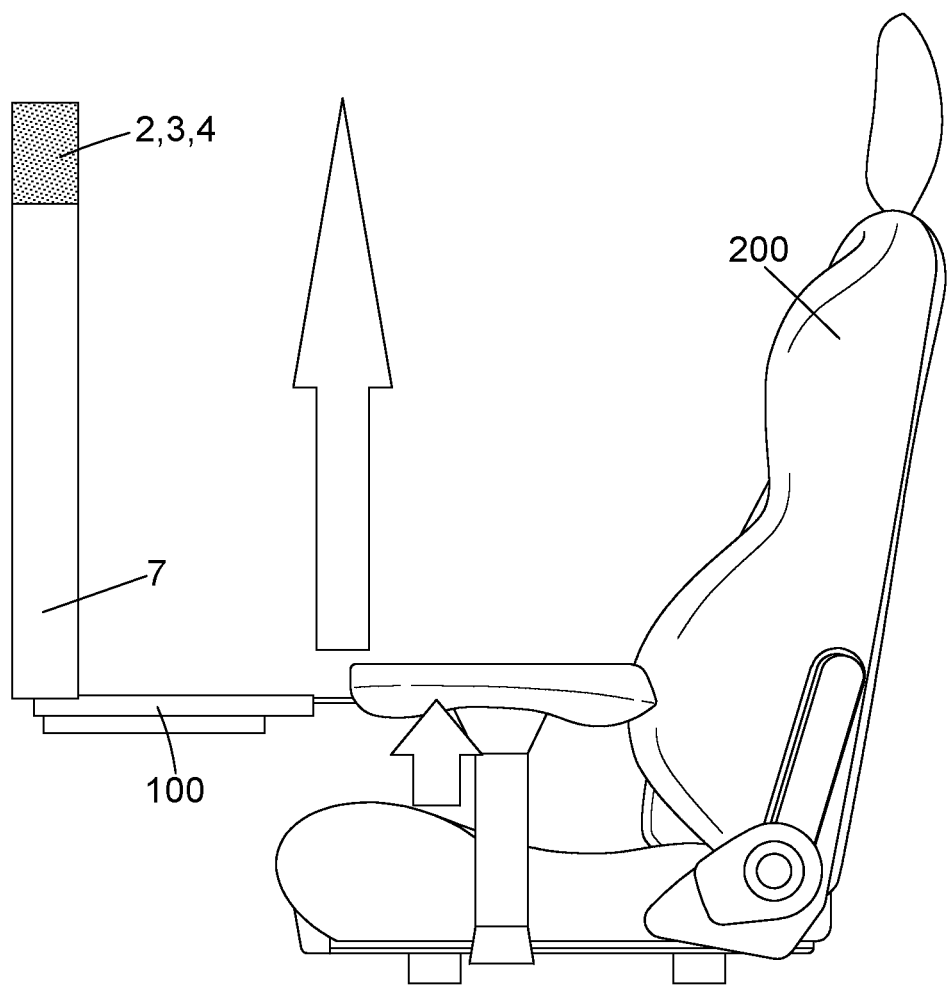
FIG. 6 schematically illustrates in plan view a desktop platform in accordance with embodiments of the invention, mounted on a chair.

In FIGS. 2, 3, 4 and 6, the desktop platform 100 is mounted on a chair 200 (labelled in FIGS. 4 and 6). The desktop platform 100 is mounted on the armrests of the chair, though in other embodiments it may be mounted on a different part of the chair. When a user sits in the chair, the user may place the desktop platform 100 on the chair in an optimal position (forwards or backwards along the armrests, for example) to suit the user. The desktop platform 100 may include means for attaching the desktop platform 100 to a chair or a table. Said means may include a retainer arranged to constrain relative movement of the desktop platform 100 and the chair or the table. The retainer may for example be or include one or more clips which hold the desktop platform 100 in a specific location on the armrests of the chair 200. In other embodiments, the desktop platform 100 may have a different type of fixing, such as screws with plates on their ends which can be loosened or tightened to apply outward pressure between surfaces, such as the inside edges of a chair's armrests.

In the embodiments illustrated in FIGS. 4 and 6, the camera sections 2, 3, 4 are within the screen section 7, above the screen, rather than directly on or in a surface of the desktop platform 100. This may advantageously mean that when cameras are mounted in the camera sections 2, 3, 4 the cameras are at an optimal height for imaging the face of the user since, in ordinary usage, the screen will be approximately at the user's eye level. In the illustrated embodiments, the cameras are embedded in the frame of the screen section 7, above the top edge of the screen. In preferred embodiments, the screen section 7 may be sized and shaped such that the camera sections 2, 3, 4 within the screen section 7 are approximately 50 cm from the surface of the desktop platform 100. The top surface of the desktop platform 100 may preferably be spaced approximately 8 cm from the seat of the chair. The desktop platform 100 may include means for adjusting the spacing of the top surface of the desktop platform from the seat of the chair and means for adjusting the spacing of the camera sections 2, 3, 4 from the surface of the desktop platform 100. This may help a user achieve a comfortable and ergonomic position for using the desktop platform 100.

The illustrated embodiments include three cameras. In the illustrated embodiments, cameras 2 and 3 and cameras 3 and 4 are separated by distances of approximately 25 to 30 cm, and the central camera is intended to be approximately 50 to 60 cm from the user's face during use of the desktop platform 100. The fields of vision of the outer cameras are angled at approximately 23° to the field of vision of the central camera. Other embodiments may include more or fewer cameras, smaller or larger distances between cameras and between cameras and the user, and smaller or larger angles between fields of view of cameras. However, the above-described combination of three cameras with the specified separations and overlapping fields of view (achieved by the two of the cameras being pointed inwards, towards the central line of the central camera's field of view) provides depth-resolution capabilities that enable a higher-quality image to be obtained than a single camera or a pair of cameras can achieve, while minimising the total number of cameras, helping to minimise the cost of the camera equipment necessary to achieve hologram-suitable image data. The fact that the cameras are to be mounted on the desktop platform 100 enables the cameras to rotate with the user and still be focussed on the face of the user if the desktop platform 100 is mounted on a rotating chair. This is a considerable advantage relative to other systems which need to have many cameras located at different positions around a chair in order to obtain images of a user's face if the user is rotating in a rotating chair.

In some embodiments, the desktop platform 100 may include one or more sensors or measuring devices, such as an inertial measurement unit comprising one or more gyroscopes, accelerometers and/or magnetometers. Said sensors/measuring devices may serve multiple purposes. For example, they may enable the angle of rotation of a user in a rotating chair to be tracked while the user is experiencing a virtual, augmented or mixed reality environment. Alternatively or additionally, the sensors/measuring devices may be able to provide feedback to a user during installation of the desktop platform 100, for example to ensure that the desktop platform 100 is aligned correctly for the cameras to obtain the necessary image data.

In some embodiments, one or more indicators or patterns may be provided with the desktop platform 100 and/or with cameras which are to be used with the desktop platform 100. The indicators or patterns may be affixable to the back of a chair 200 within the fields of view of several of the cameras, as illustrated at 201 in FIG. 4, and may assist in the calibration of the cameras after the cameras have been installed on/in the desktop platform 100. Alternatively or additionally, one or more chair-mountable LEDs—such as infrared LEDs—may be provided with the desktop platform 100 and/or with cameras which are to be used with the desktop platform 100, to assist in the calibration of the cameras. The LEDs may for example be affixable to the headrest of the chair in the fields of view of several of the cameras.

Figure 8:
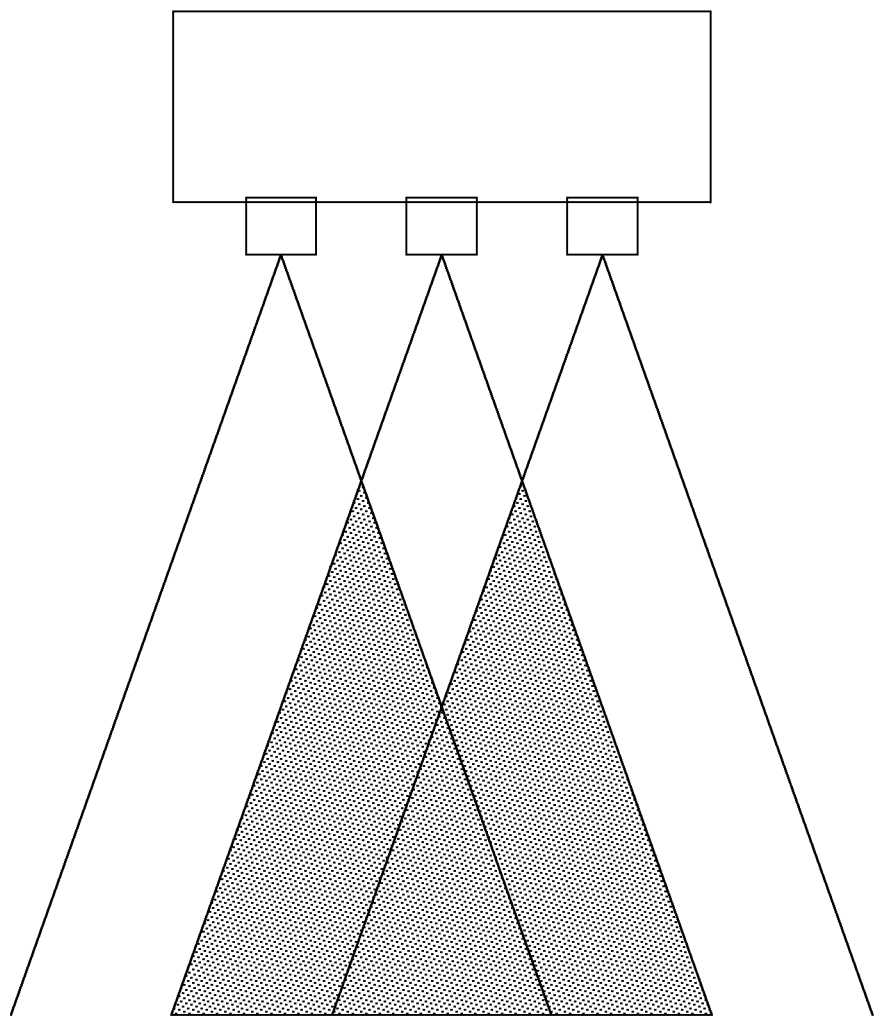
FIG. 8 schematically illustrates in plan view fields of view of three sensors in a single camera body.

Preferably, cameras which are used in conjunction with the desktop platform 100 are shutter synchronous and globally shuttered. These features enable images from the multiple cameras to be freeze-framed at the same instant. Preferably, the cameras are RGBz cameras, i.e. cameras capable of sensing red, green and blue wavelengths of light—possibly using one sensor or several different sensors, as illustrated in FIG. 8—and also "z" depth, i.e. distance of an object from the cameras. The cameras' being able to sense "z" depth may enable the shape and contours of the user's face to be determined using triangulation of "z" values from the multiple cameras. This data can then be used to produce an image of the user which can be shown as a hologram or other three-dimensional rendering.

In some embodiments, one or more lights may be mountable on the desktop platform 100. This may enable a user to install and/or use the desktop platform 100 and any user inputs associated therewith (such as keyboard, mouse, trackpad or handheld user input device) more easily in a darkened environment.

Although in the illustrated embodiments the desktop platform 100 has been shown attached to a chair, the desktop platform 100 could also be attached to a table (such as a desk at which a person normally works) to provide the functionality of each of the different sections of the desktop platform 100 at the desk. This may advantageously allow the user of the desktop platform 100 to have a consistent virtual, augmented or mixed reality experience in different physical locations. In such cases, the user may clip or otherwise affix the desktop platform 100 to the cable, to minimise slippage of the desktop platform 100. Alternatively, it may be possible to rely on friction alone between the desktop platform 100 and the table. The underside of the desktop platform 100 may for example be provided with a high-friction surface, such as a rubberised and/or stippled, knurled or criss-crossed outer layer.

In some embodiments, at least one of the camera sections 2, 3, 4 may be located on the desktop platform 100 itself and at least one of the camera sections 2, 3, 4 may be located on the screen section 7.

In some embodiments, a projector may be provided to project an image, e.g. onto an unpowered screen mounted at the screen section 7 of the desktop platform 100. The projector may be arranged for mounting on the head of the user, on the headrest, back or arm of a chair, or in another location from which it can project light onto the screen. The desktop platform 100 may include a port or socket which the projector can connect to.

In some embodiments, the desktop platform 100 may include one or more connectors which the various devices discussed above (e.g. keyboard, mouse, trackpad, cameras, projector, etc.) can connect to, and one or more connectors which the external device (e.g. games console, mobile phone or computer) can connect to. These connectors may advantageously allow the user of the desktop platform 100 to connect all of the input and output devices to the desktop platform 100 and to transfer all of the data that needs to be received from and sent to the external device via the one or more connectors which the external device can connect to. The one or more connectors for connecting the external device may advantageously all be in one place on the desktop platform 100, such that connecting the external device is comparatively easy.

In some embodiments, the desktop platform 100 may include a section on which a user can place items such as the user's wallet or mobile phone. That section of the desktop platform 100 may be provided with a high-friction surface, to minimise the risk of said items sliding off the desktop platform 100. In some embodiments, that section might include a wireless charging pad for wirelessly charging a mobile phone, tablet or other device, e.g. while the user is immersed in virtual, augmented or mixed reality using the desktop platform 100.

In some embodiments, the desktop platform 100 may include additional inputs and outputs. It may for example include a main power socket to receive power from an external source. It may include one or more speakers for providing sound output to a user.

The invention claimed is:

1. A desktop platform for use with virtual, augmented or mixed reality technology, comprising:
    a plurality of camera sections;
    a keyboard section;
    a trackpad section;
    a screen section; and
    means for supporting a user input device.

2. A desktop platform as claimed in claim 1, further comprising a plurality of cameras for mounting on the desktop platform at the plurality of camera sections.

3. A desktop platform as claimed in claim 1 further comprising at least one light for mounting on the desktop platform.

4. A desktop platform as claimed in claim 1, the means for supporting a user input device comprising a hole for receiving at least part of the handheld user input device.

5. A desktop platform as claimed in claim 1 additionally including means for attaching the desktop platform to a chair or a table.

6. A desktop platform as claimed in claim 5, wherein the means for attaching the desktop platform to a chair or a table includes a retainer arranged to constrain relative movement of the desktop platform and the chair or the table.

7. A desktop platform as claimed in claim 1 wherein the plurality of camera sections includes a first camera section for mounting a camera in a position which is substantially central across a width and/or a depth of the desktop platform and one or more side camera sections for mounting cameras offset from the substantially central position on the desktop platform.

8. A desktop platform as claimed in claim 7,
    wherein the one or more side camera sections are arranged one either side of the first camera section.

9. A desktop platform as claimed in claim 1 wherein the plurality of camera sections are arranged for mounting cameras with a common field of vision between the cameras.

10. A desktop platform as claimed in claim 1 wherein the plurality of camera sections are arranged for mounting cameras at different positions across a depth of the desktop platform.

11. A desktop platform as claimed in claim 1 wherein the screen is a retractable soft screen.

12. A desktop platform as claimed in claim 11, additionally including means for supporting the retractable soft screen in an unwound state.

13. A desktop platform as claimed in claim 1 wherein the plurality of camera sections comprises only three camera sections.

14. A system comprising:
    a desktop platform as claimed in 1; and
    a plurality of cameras for mounting at the plurality of camera sections, the cameras being arranged to produce an image of part of a user of the desktop platform.

15. A system as claimed in claim 14, additionally including a chair for mounting the desktop platform on.

16. A system as claimed in claim 15, additionally including one or more indicators, patterns or LEDs for mounting on the chair, the one or more indicators, patterns or LEDs being arranged to assist in calibrating the plurality of cameras.

* * * * *